Aug. 28, 1962 W. D. LUDWIG 3,051,187

PRESS SAFETY VALVE

Filed Oct. 29, 1959 5 Sheets-Sheet 1

INVENTOR.
WALTER D. LUDWIG
BY
Donnelly, Mentag & Harrington
ATTORNEYS

INVENTOR.
WALTER D. LUDWIG
BY
Donnelly, Mentag & Harrington
ATTORNEYS

Aug. 28, 1962 W. D. LUDWIG 3,051,187

PRESS SAFETY VALVE

Filed Oct. 29, 1959 5 Sheets-Sheet 3

INVENTOR.
WALTER D. LUDWIG
BY
Donnelly, Mentag & Harrington
ATTORNEYS

INVENTOR.
WALTER D. LUDWIG
BY
Donnelly, Mentag & Harrington
ATTORNEYS

PRESS SAFETY VALVE

Filed Oct. 29, 1959

INVENTOR
WALTER D. LUDWIG

BY Donnelly, Mentag & Harrington
ATTORNEYS

United States Patent Office 3,051,187
Patented Aug. 28, 1962

3,051,187

PRESS SAFETY VALVE

Walter D. Ludwig, 3865 W. Lincoln Drive, Birmingham, Mich.

Filed Oct. 29, 1959, Ser. No. 849,554
5 Claims. (Cl. 137—110)

This invention relates to improvements in air valves, and more particularly to a new and useful safety valve for controlling a fluid as air and which is adapted to operate a press clutch, brake, or any other device where safety is a factor in its operation.

It is an important object of this invention to provide a safety valve for use on presses and the like which includes a pair of pilot operated master flow valves, whereby if one master valve fails the other master valve functions to shut off the flow of air to the press by means of both a pneumatic and an electric control means.

It is another object of this invention to provide a safety air valve of the character described which includes two 3-way valves connected in parallel with each other and which feed air under pressure through a novel balanced piston poppet valve to the device being controlled by air under pressure, whereby if one of the 3-way valves fails, the piston poppet valve will be moved from a normal operating position to a position to block the flow of air from the remaining operative 3-way valve and exhaust it to the atmosphere, and also to operate an alarm, if desired.

It is a further object of this invention to provide a safety valve of the character described which is compact and rugged in construction, light in weight, economical of manufacture, and efficient in operation.

Other objects, features and advantages of this invention will be apparent from the following detailed description and appended claims, reference being had to the accompanying drawings forming a part of the specification wherein like reference numerals designate corresponding parts of the several views.

Figure 18:
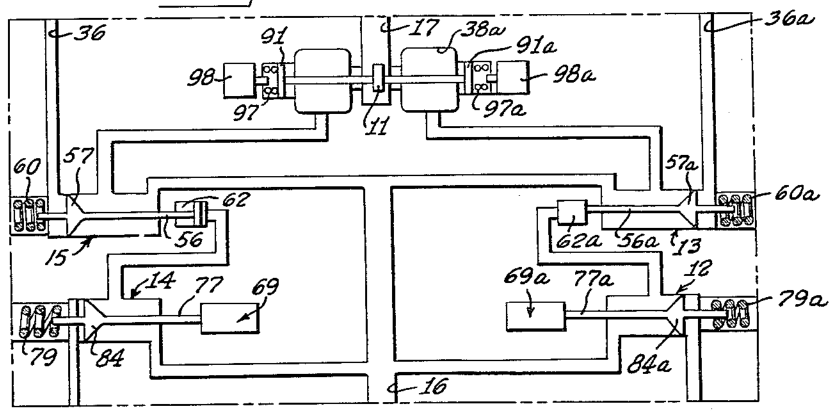
FIG. 18 is a schematic flow diagram similar to that of FIG. 17, and showing the valve in an energized condition.

Referring now to the drawings and in particular to FIGS. 1, 2, 3 and 11 wherein is shown an illustrative embodiment of the invention, the numeral 10 generally indicates the base member of the valve which carries the piston poppet valve or shuttle valve generally indicated by the numeral 11. The valve of the present invention further includes a first pilot valve 12 which is adapted to control a first master flow valve 13 and these two valves are disposed on the right side of the base 10 as viewed in FIG. 3. A second pilot valve 14 and a second master flow valve 15 are operatively mounted on the opposite or left side of the base 10. The valve of the present invention is constructed and arranged whereby the air under pressure is adapted to enter the base 10 through the inlet port 16 and pass simultaneously through the aforementioned pair of flow valves and out to the press to be controlled through the outlet port 17. The aforementioned air flow through both of the master valves 13 and 15 is effected when the device of the present invention is energized for operation because of the parallel connection of these master valves with the piston poppet valve 11 as illustrated in FIG. 18. The operation of the valve of the present invention will be described more fully in detail after the various parts thereof have been more fully described in detail.

Figure 1:
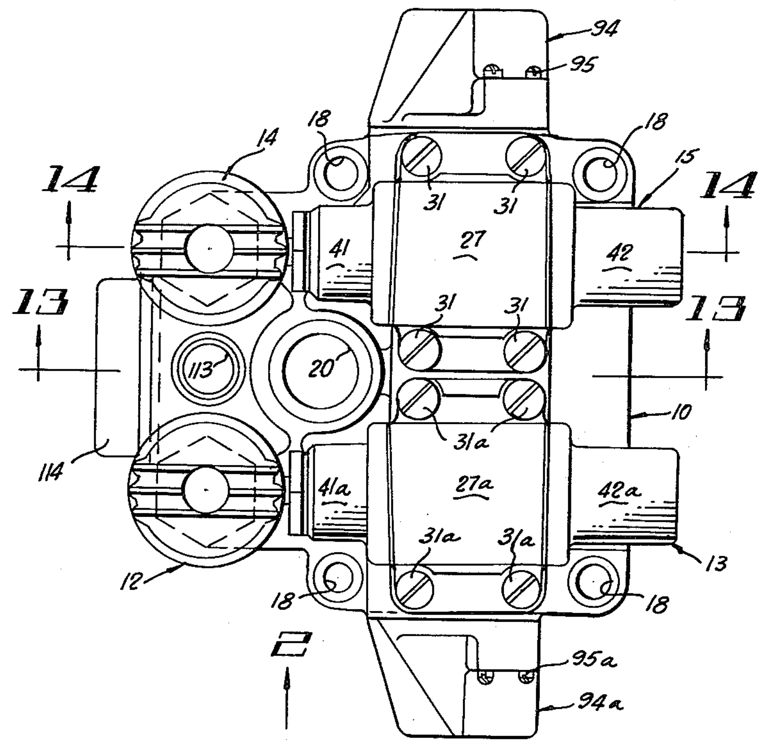
FIG. 1 is a top plan view of a safety air valve made in accordance with the principles of the invention.
Figure 2:
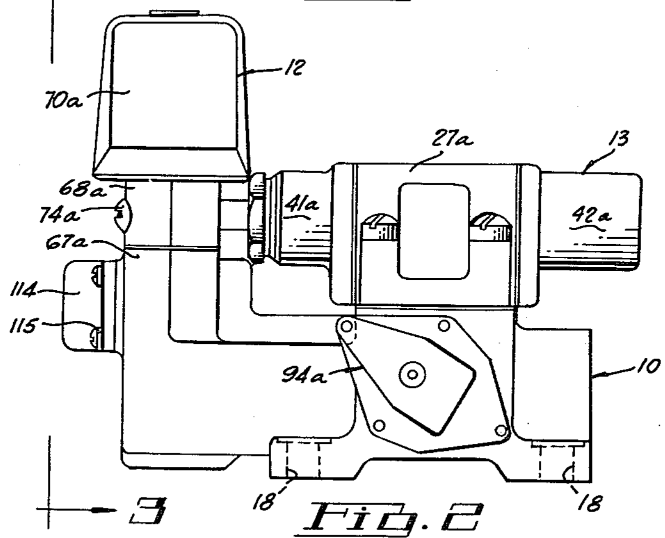
FIG. 2 is a side elevational view of the structure illustrated in FIG. 1, taken in the direction of the arrow marked "2"
Figure 9:
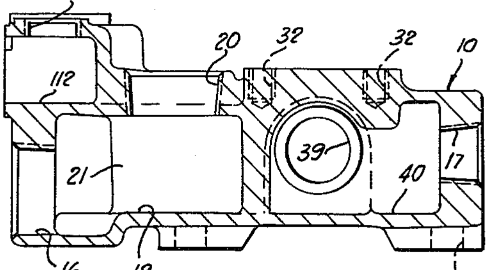
FIG. 9 is a central longitudinal elevational sectional view of the base structure illustrated in FIG. 4, taken along the line 9—9 thereof, and looking in the direction of the arrows.
Figure 11:
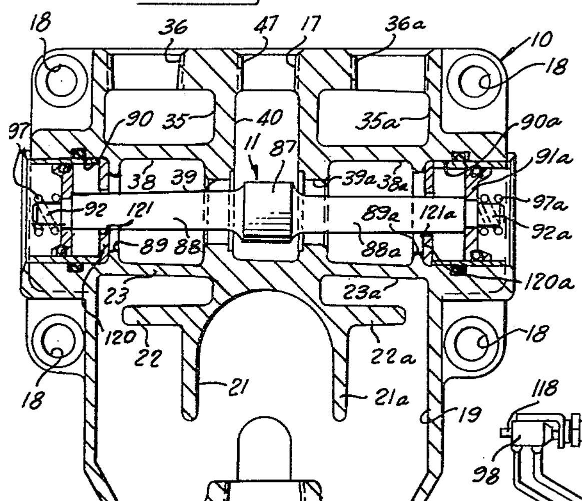
FIG. 11 is a horizontal sectional view of the base structure illustrated in FIG. 6, taken along the line 11—11 thereof, and looking in the direction of the arrows, with the shuttle valve assembly in place.

As shown in FIGS. 1, 9 and 11, the base 10 is substantially rectangular in over-all shape and is provided with the bolt holes 18 at the corners thereof for the reception of suitable hold-down bolts or the like. The inlet port 16 communicates with the receiving chamber 19 which is formed in the lower front end of the base 10. Formed in the upper wall of the receiving chamber 19 is the outlet port 20 which may be connected to a suitable surge tank, if desired. If a surge tank is not used, the port 20 is merely closed by a suitable pipe plug since this port is tapped with one inch pipe thread.

Figure 8:
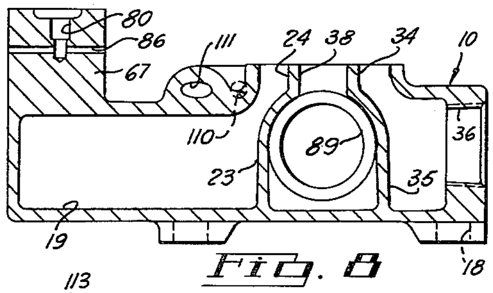
FIG. 8 is a longitudinal elevational sectional view of the base structure illustrated in FIG. 4, taken along the line 8—8 thereof, and looking in the direction of the arrows.
Figure 7:
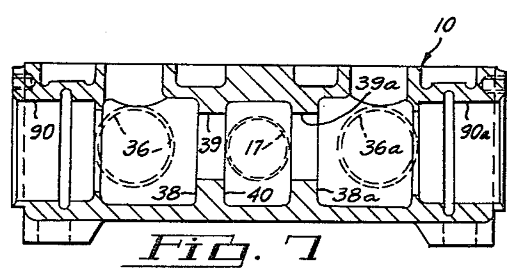
FIG. 7 is an elevational sectional view of the structure illustrated in FIG. 4, taken along the line 7—7 thereof, and looking in the direction of the arrows.
Figure 13:
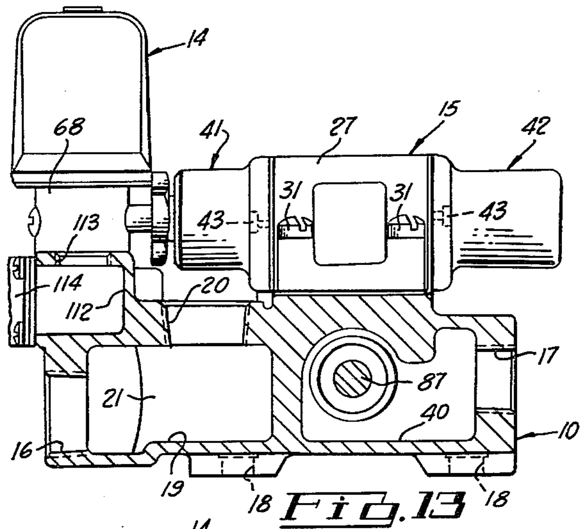
FIG. 13 is an elevational sectional view of the valve structure illustrated in FIG. 1, taken along the line 13—13 thereof, and looking in the direction of the arrows.
Figure 14:
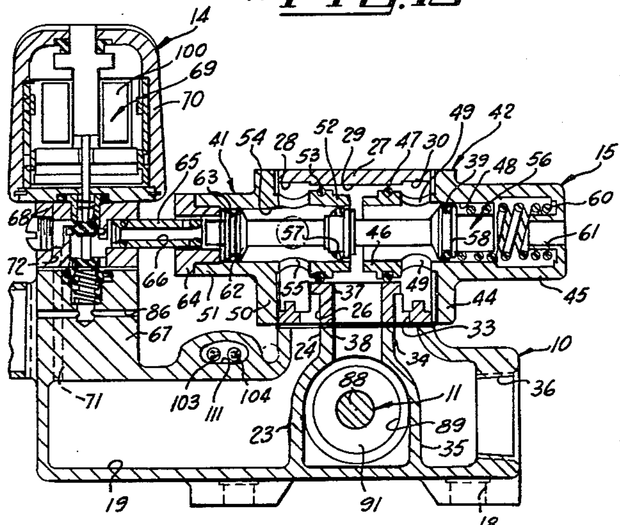
FIG. 14 is an elevational sectional view of the valve structure illustrated in FIG. 1, taken along the line 14—14 thereof, and looking in the direction of the arrows.

The flow of air under pressure through the left side of the valve or through the master flow valve 15 will be first described. As shown in FIGS. 8, 11 and 14, the left side of the receiving chamber 19 is provided with the baffle or dividing walls 21 and 22. Air under pressure entering into the chamber 19 would pass around the walls 21 and 22 and into compartment 23 from where it would flow upwardly through the passage way 24 and into the horizontal extension thereof as indicated by the numeral 25 in FIG. 4. The passage area 25 in the base 10 is adapted to mate with the similar passage 26 which opens into the lower end of the master valve body 27. The master valve body 27 is provided with the square chamber 28 at the left end thereof as viewed in FIG. 14, and this chamber communicates with the inner bore 29 in the body 27 at one side thereof and with the open end of the body on the other side thereof. As shown in FIG. 14, the master valve body 27 is also provided with a second square chamber 30 which is on the other end thereof which is similar to the chamber 28. The master valve body 27 is fixedly secured to the base 10 by any suitable means as by the four bolts 31 as shown in FIGS. 1 and 13. The bolts 31 are adapted to be threadably engaged in the holes 32 formed in the top of the base 10 as shown in FIG. 4.

Figures 3, 4, 5:
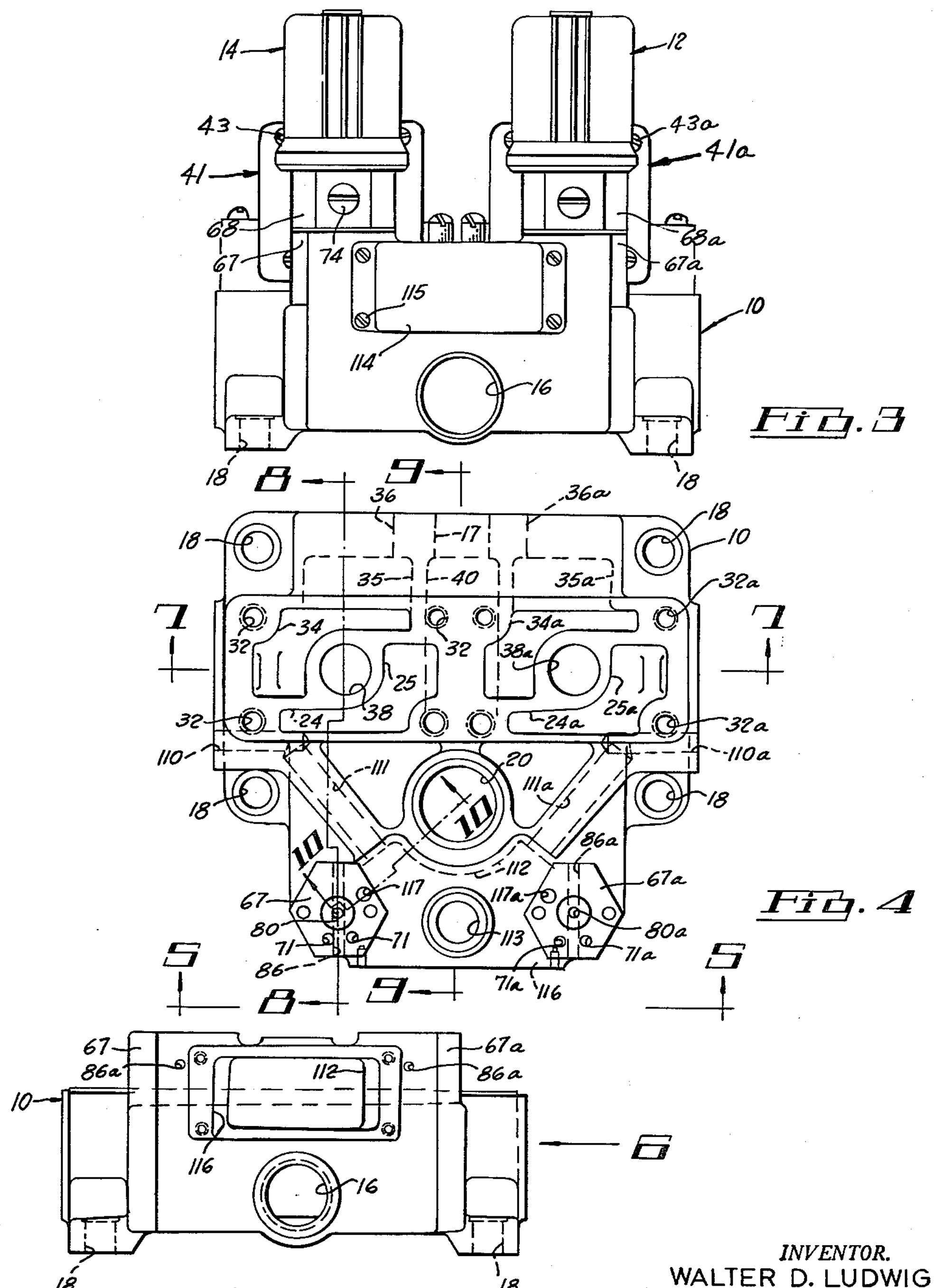
FIG. 3 is an end elevational view of the structure illustrated in FIG. 2, taken along the line 3—3 thereof, and looking in the direction of the arrows.
FIG. 4 is a top plan view of the base structure employed in the invention.
FIG. 5 is a front end elevational view of the base structure illustrated in FIG. 4, taken along the line 5—5 thereof, and looking in the direction of the arrows.
Figure 6:
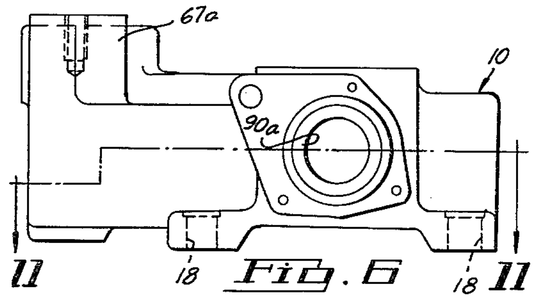
FIG. 6 is a right side elevational view of the base structure illustrated in FIG. 5, taken in the direction of the arrow marked "6"

As shown in FIGS. 4 and 14, the square chamber 30 communicates at the lower end thereof with the exhaust passage 33 which is shaped so as to mate with and communicate with the passage way 34 formed in the base 10. The passage 34 communicates with the chamber 35 which in turn communicates with the atmosphere through the exhaust port 36. The central bore 29 of the master valve body 27 also communicates with the centrally disposed passage 37 on the lower side thereof which passage communicates with the chamber 38 formed in the base 10. The chamber 38 communicates through the valve bore 39 with the chamber 40 when the shuttle valve 11 is in the position shown in FIGS. 17, 18 and 19. As shown in FIG. 11, the chamber 40 is connected to the press to be controlled by means of the outlet port 17.

The air under pressure entering the peripheral square chamber 28 in the master valve body 27 will be directed out to the press to be controlled through the passage 37 by means of the following described master flow control valve structure. As shown in FIGS. 3, 13 and 14, fixedly mounted in the front end of the valve body 27 is the inner retainer generally indicated by the numeral 41 and fixedly mounted in the rear end of the body 27 is a similar outer retainer generally indicated by the numeral 42. The retainers 41 and 42 may be fixedly secured in the body 27 by any suitable means as by the screws 43. The outer container 42 comprises a flange portion 44 from the outer side of which extends the integral hub portion 45. Extended inwardly from the flange portion 44 is the inner hub portion 46 which is adapted to extend into the right end of the body bore 29 as viewed in FIG. 14 and to be maintained in sealing engagement therewith by means of the O-ring sealing member 47. The outer retainer 42 is provided with the axial bore 48 which opens on the left end thereof into the bore 29 of the valve body 27. The retainer bore 48 communicates with the valve body peripheral chamber 30 through a plurality of holes or ports 49 which are formed around the inner end of the hub portion 46. The inner retainer 41 comprises the flange portion 50 and the outwardly extended and inwardly extended integral hub portions 51 and 52, respectively. The inner end of the hub portion 52 is in sealing engagement with the bore 29 in the master valve body 27 by means of the O ring 53. The inner retainer 41 is also provided with an axial bore therethrough as 54. The retainer bore 54 communicates with the valve body bore 29. The bore 54 also communicates with the peripheral square chamber 28 by means of a plurality of peripherally disposed ports 55.

Figure 19:
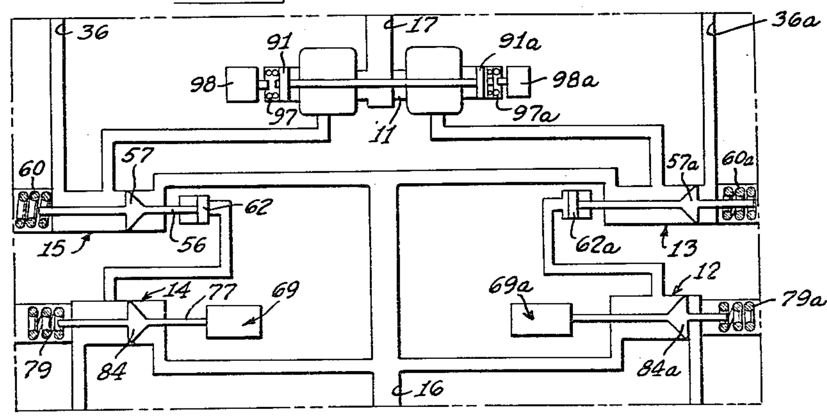
FIG. 19 is a schematic flow diagram similar to that of FIGS. 17 and 18, and showing the air flow condition in the valve when it is in a safety position with one of the 3-way flow valves in an inoperative condition.

Slidably mounted in the retainer bores 54 and 48 is the master valve directional flow control spool generally indicated by the numeral 56 as shown in FIG. 14. The valve spool 56 is provided with the centrally disposed enlarged valve 57 which is adapted to be seated alternately in either the inner end of the bore 54 or the bore 48 for sealing these bores against any flow of air therethrough. The valve spool 56 is provided with the enlarged spool portion 58 on the right or rear end thereof as viewed in FIG. 14, and this portion 58 is provided with an O ring sealing means 59. A coil spring 60 is seated in the outer end of the enlarged portion of the bore 48 and abuts at its inner end against the enlarged spool portion 58 and at its outer end against the end wall of the retainer 42. The outer end of the spring 60 is seated around the inwardly extended annular projection 61 and this spring functions to normally bias the valve spool 56 inwardly so as to close the bore 54, whereby the master spool valve 15 would be in the "off" or safety position as shown in FIGS. 14 and 19. The valve spool 56 is further provided on the left end thereof with the enlarged portion 62 which functions as a piston and which is provided with the O-ring sealing means 63. The outer end of the retainer 41 is enclosed by the cylinder plug 64 which is provided with a hole therethrough in which is seated the bushing 65. The bushing 65 is provided with the passage 66 therethrough for conveying control air under pressure against the valve spool piston 62 for actuating the valve spool 56 to the right, as viewed in FIG. 14, against the pressure of spring 60. The air operating against the spool piston 62 functions to move the valve spool 56 to the right, as viewed in FIG. 14, so as to seat the valve 57 in the inner end of the bore 48, so as to seal this bore and permit operating air under pressure to flow from the chamber 28 down through the shuttle valve passages and out through the outlet port 17 to the press which is to be controlled.

Figure 15:
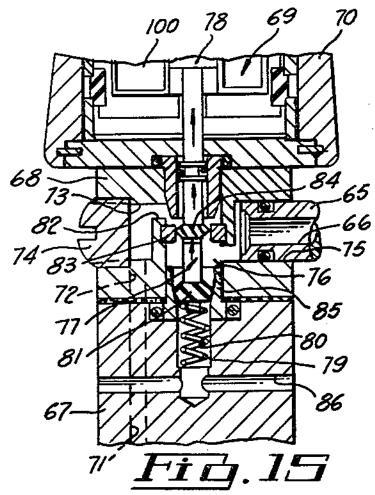
FIG. 15 is a fragmentary, enlarged elevational sectional view of the pilot valve spool structure shown in FIG. 14.

As shown in FIGS. 14 and 15, the pressurized control air is transmitted to the bushing passage 66 by the following described pilot valve structure. The valve base 10 is provided with the pilot valve base block 67 on which is fixedly mounted, by any suitable means, the pilot valve body 68. Fixedly mounted on the top end of the pilot valve body 68 is a solenoid, generally indicated by the numeral 69, which may be of any suitable conventional type. The solenoid 69 is enclosed by the cover 70. Air for controlling the master flow valve 15 is drawn from the air receiving chamber 19 by means of the two passages 71 formed in the base block 67, and the two passages 72 which are formed in the pilot valve body 68. The passages 71 and 72 communicate with each other and with the chamber 73 which is formed in the valve body 68. The chamber 73 is provided with an opening to the atmosphere through the body 68, and this opening is normally closed by the plug 74.

As shown in FIG. 15, the outer end of the bushing 65 is mounted in the port 75 in the valve body 68. The port 75 communicates with the centrally disposed pilot valve chamber 76 in which is slidably mounted the pilot valve spool generally indicated by the numeral 77. The pilot valve spool 77 abuts the armature 78 of the solenoid. When the solenoid 69 is energized the pilot valve spool 77 is moved downwardly against the pressure of the spring 79 which is mounted in the reduced lower end portion 80 of the pilot valve chamber. The spring 79 bears against the lower enlarged valve portion or exhaust valve 81 which is formed on the lower part of the valve spool 77. The air entrance chamber 73 is connected by means of the passage 82 to the upper end of the valve chamber 76. A valve seat 83 is mounted in the chamber 73 below the passage 82. A second or upper enlarged valve head 84 is mounted on the valve spool 77 and is adapted to be seated in the valve seat 83 when the solenoid 69 is de-energized and the spool 77 is moved upwardly by the pressure of spring 79. When the solenoid 69 is energized control air under pressure will be allowed to pass from the chamber 73 and through the valve seat 83 and into the bushing passage 66 for engagement against the master spool piston 62. When the solenoid 69 is energized the valve 84 is moved downwardly out of the valve seat 83 to permit the aforementioned flow of air through the passage 66 and the lower or exhaust valve 81 will be forced downwardly into sealing engagement with the exhaust valve seat 85. It will be seen that when the solenoid 69 is de-energized, the spring 79 will move the spool 77 upwardly to seat the valve 84 in the valve seat 83 so as to block any further flow of air into the passage 66 and to unseat the valve 81 so as to exhaust air under pressure from the passage 66 and to the atmosphere by way of the bore 80 and the cross passage 86.

Figure 16:
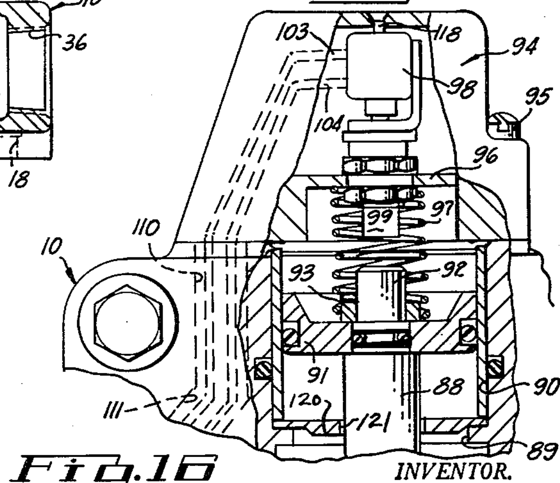
FIG. 16 is a fragmentary, broken away, and partly in section, horizontal view of the one end of the piston poppet valve employed in the invention.

As shown in FIGS. 11 and 16, the shuttle valve or poppet valve 11 comprises the centrally disposed enlarged portion or valve 87 which is disposed in the chamber 40 and which is adapted to be moved to the right or to the left as viewed in FIG. 11, so as to be seated in and enclose the inner ends of the passageways 39 and 39*a*. Extending outwardly from each side of the valve portion 87 are the reduced shaft portions 88 and 88*a* which extend to the left and right of the valve structure as shown in FIG. 11. Both ends of the valve 11 are constructed the same and, accordingly, the left end thereof will be described in detail and the right end thereof will be marked with similar reference numerals followed by the small letter "*a*." As shown in FIGS. 11 and 16, the valve shaft 88 extends to the left through the passage 39, the chamber 38, the passage 89 and into the cylinder chamber 90. A piston 91 is fixedly mounted on the outer reduced end 92 of the spool shaft 88 by means of the retainer nut 93. The cylinder 90 is open on the outer end thereof, and this open end is enclosed by the switch housing generally indicated by the numeral 94 in FIG. 16. The housing 94 is secured to the base 10 by means of the bolts 95. The switch housing 94 is provided with the inner wall 96 which encloses the outer end of the cylinder 90. The spring 97 is mounted in the outer end of the cylinder 90 and extends outwardly into the switch housing 94. The piston 91 is engaged by the inner end of the spring 97 and the insert wall 96 is engaged by the outer end of the spring 97. It will be understood that the right end of the shuttle valve 11, as viewed in FIG. 11, is provided with the same piston and spring biasing structure.

Figure 17:
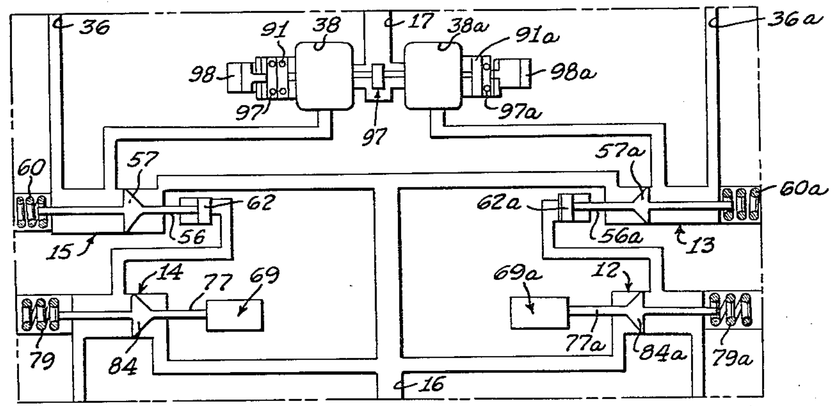
FIG. 17 is a schematic flow diagram of the safety valve of the invention and showing the flow of air therethrough when the valve is de-energized.

The foregoing detailed description of the structure of the pilot valve 14 and the master flow control valve 15 and the left side structure of the base 10 is equally applicable to the right pilot valve 12, the master flow control valve 13 and the right side of the base 10. Accordingly, the corresponding parts have been marked with similar reference numerals followed by the small letter "*a*." FIGS. 17, 18 and 19 illustrate the positions of the various components of the valve of the present invention when the valve is de-energized, energized, and in the safety position, respectively. FIG. 17 shows that when the solenoids 69 and 69*a* are de-energized, the springs 79 and 79*a* move the pilot valves 77 and 77*a* upwardly whereby the control air pressure is exhausted from the master flow valves 15 and 13. The springs 60 and 60*a* in this condition then operate to bias the master flow valve spools 56 and 56*a* so as to block off working air pressure from the passages 38 and 38*a*. Accordingly, the springs 97 function to maintain the shuttle valve 11 in the central position as shown in FIG. 17, and the press to be controlled is exhausted to the atmosphere through the exhaust ports 36 and 36*a*.

When the solenoids 69 and 69*a* are energized, control air is admitted to the pistons 62 and 62*a* of the master flow valves 15 and 13 whereby the valve spools 56 and 56*a* are moved to the positions shown in FIG. 18. It will be seen that working pressure is thus permitted to pass through both of the chambers 38 and 38*a* and out through the outlet port 17 and to the press to be controlled. At the same time, the exhaust ports 36 and 36*a* are blocked by means of the valves 57 and 57*a* being moved to the right as shown in FIG. 14. As shown in FIG. 18, in this condition the shuttle valve 11 is maintained in the central position.

If one or more of the pilot valves 12 and 14 or the master flow valves 13 and 15 fail, the press will be automatically shut down and a warning signal may be actuated by such down condition, if desired. A condition of failure is illustrated in FIG. 19 wherein the solenoid 69 has failed and become de-energized. It will be seen from FIG. 19 that under this condition the spring 79 will bias the valve spool 77 upwardly so as to exhaust the control air from the piston end of the flow valve spool 56. The spring 60 in the flow valve 15 will move the valve 57 to the left end to the position as shown in FIG. 14, whereby the working air pressure is blocked from the chamber 38, and the chamber 38 is connected through the open bore 48 to the exhaust chamber 35 and to the atmosphere through the port 36. As shown in FIG. 19, the left side of the shuttle valve 11 is thus open to the atmosphere and an unbalanced condition is created which will move the shuttle valve to the right as shown in FIG. 19 whereby the press clutch to be controlled will be exhausted to the atmosphere through the port 17, the flow valve 15 and the exhaust port 36. The shuttle valve 11 will be locked in this position by means of the working air acting on the piston 91*a*, so as to force the shuttle valve to the right as shown in FIG. 19. The aforementioned structure provides a pneumatic shut-off control system.

Figure 12:
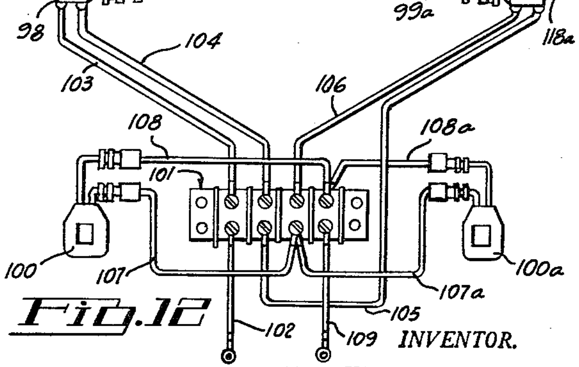
FIG. 12 is a wiring diagram of the electrical control system of the safety valve.

As shown in FIGS. 12 and 16, the valve of the present invention also includes an electric shut-off system. As illustrated in FIG. 12, a normally closed micro-switch, generally indicated by the numeral 98, is mounted in the switch housing 94 and is provided with the operating button 99 for engagement with the shuttle valve shaft reduced end 92 when the shuttle valve is moved to the left as viewed in FIGS. 11 and 17. A similar micro-switch 98*a* is mounted in the switch housing 94*a* for engagement with the reduced valve shaft end 92*a* when the shuttle valve is moved to the right end as shown in FIG. 19. The switches 98 and 98*a* control the solenoid coils 100 and 100*a* and are connected thereto as shown in FIG. 12, by means of the terminal block generally indicated by the numeral 101.

As shown in FIG. 12, one terminal of the switch 98 is connected to the power source lead or conductor 102 by means of the terminal block and the lead 103. The other terminal of the switch 98 is connected by the leads 104 and 105 and the terminal block to the one terminal of the other switch 98*a* so as to connect the switches 98 and 98*a* in series with each other. The other terminal of the second switch 98*a* is connected to the terminal block by means of the lead 106. One end of each of the solenoid coils 100 and 100*a* is connected to the lead 106 by means of the terminal block and the lead 107 and the lead 107*a*, respectively. The other end of each of the solenoid coils 100 and 100*a* is connected by means of the leads 108 and 108*a*, respectively, to the other power source lead 109 through the terminal block 101. It will be seen that the two solenoid coils 100 and 100*a* are connected in parallel with each other and in series with the switches 98 and 98*a*, whereby, when either of the switches are opened by means of the shuttle valve shaft engaging the button 99 or 99*a* both of the solenoids will be rendered inoperative. If either of the switch operating buttons 99 or 99*a* is engaged, the respective switch will be opened and the circuit through the solenoid coils 100 and 100*a* will be opened. Accordingly, if one side of the valve fails, as illustrated in FIG. 19, the solenoid 69*a* will be de-energized and the valve will assume the status shown in FIG. 17. It will be seen that when one side of the valve's air circuit fails, the valve is first thrown into the safety position pneumatically as shown in FIG. 19, and then the valve is completely de-energized as shown in FIG. 17.

Figure 10:
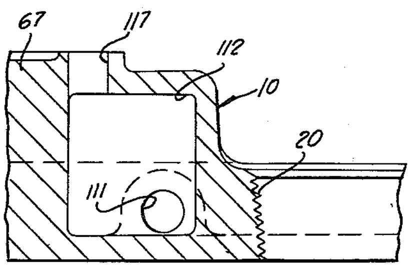
FIG. 10 is a fragmentary, elevational sectional view of the base structure illustrated in FIG. 4, taken along the line 10—10 thereof, and looking in the direction of the arrows.

As shown in FIGS. 4, 5, 13, 14 and 16, the switch leads 103 and 104 are passed from the switch housing 94 to the conduit junction chamber 112 by means of the conduits 110 and 111. The conduits 110*a* and 111*a* carry the leads 105 and 106 from the switch housing 94*a* to the chamber 112. As shown in FIG. 4, the chamber 112 is provided with the opening 113 on the upper side thereof for passage therethrough of the power source leads 102 and 109 for connection to a suitable source of power. As shown in FIGS. 1 and 3, the terminal block 101 is adapted to be carried in the conduit cover 114 which is secured over the opening 116 by means of the screws 115. As shown in FIGS. 4 and 10, the base portion 67 is provided with the vertical conduit 117 for conducting the leads 107 and 108 from the chamber 112 up to the solenoid coil 100. The base portion 67*a* is provided with a similar conduit 117*a*. The switches 98 and 98*a* are provided with a similar conduit 117*a*. The switches 98 and 98*a* are provided with the usual manual re-set buttons 118 and 118*a*, respectively.

As shown in FIGS. 11 and 16, the outer sides of the chambers 38 and 38*a* are enclosed by means of the shuttle baffles 120 and 120*a*, respectively. These baffles are provided with the openings 121 and 121*a* through which extend the outer ends of the shuttle valve 87. The shuttle baffles 120 and 120*a* function to take minor shock waves which occur in the air under pressure in the shuttle valve chamber when the shuttle valve is in the normal operating position. That is, they absorb such minor shock waves so that the valve will not operate prematurely due to these shock waves but will only operate if there is a positive failure of one of the master flow valves.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. An air valve comprising: a shuttle valve for connection to an apparatus to be supplied with fluid under pressure; a pair of flow control valves connected in parallel with each other and to a source of fluid under pressure; one of said flow control valves being connected to one end of the shuttle valve and the other flow control valve being connected to the other end of the shuttle valve, whereby when fluid under pressure is passed to the shuttle valve by the flow control valves, the shuttle valve will be under a balanced condition and will be positioned in a central position so as to pass the fluid under pressure to the apparatus to be supplied with fluid under pressure, and whereby when either one of the flow control valves fails, the fluid pressure on the shuttle valve will be unbalanced and the shuttle valve will be moved to a position to block the flow of fluid to said apparatus and to exhaust said apparatus to the atmosphere; a pilot valve interconnected between each of said flow control valves and said source of fluid under pressure for controlling the operation of the flow control valves; each of said pilot valves being moved to the operative position by a solenoid; and, electric circuit means connected to the solenoids of the pilot valves and operable to de-energize said solenoids when the shuttle valve is unbalanced due to a failure in the air valve.

2. An air valve comprising: a shuttle valve for connection to an apparatus to be supplied with fluid under pressure; said shuttle valve including a spool having a piston on each end thereof and a centrally mounted valve head; a pair of flow control valves connected in parallel with each other and to a source of fluid under pressure; one of said flow control valves being connected to one side of the shuttle valve between the valve head and the one piston and the other flow control valve being connected to the other side of the shuttle valve between the valve head and the other piston, whereby when fluid under pressure is passed to the shuttle valve by the flow control valves, the valve head will be under a balanced condition and will be disposed in a central position so as to pass the fluid under pressure to the apparatus to be supplied with fluid under pressure and whereby when either one of the flow control valves becomes inoperative, the fluid under pressure from the other flow control valve will act on the piston on its respective end of the shuttle valve and will move the shuttle valve to a position to block the flow of fluid to said apparatus and to exhaust said apparatus to the atmosphere through the inoperative flow control valve.

3. An air valve comprising: a shuttle valve for connection to an apparatus to be supplied with fluid under pressure; said shuttle valve including a spool having a piston on each end thereof and a centrally mounted valve head; a pair of flow control valves connected in parallel with each other and to a source of fluid under pressure; one of said flow control valves being connected to one side of the shuttle valve between the valve head and the one piston and the other flow control valve being connected to the other side of the shuttle valve between the valve head and the other piston, whereby when fluid under pressure is passed to the shuttle valve by the flow control valves, the valve head will be under a balanced condition and will be disposed in a central position so as to pass the fluid under pressure to the apparatus to be supplied with fluid under pressure and whereby when either one of the flow control valves becomes inoperative, the fluid under pressure from the other flow control valve will act on the piston on its respective end of the shuttle valve and will move the shuttle valve to a position to block the flow of fluid to said apparatus and to exhaust said apparatus to the atmosphere through the inoperative flow control valve; each of said flow control valves including a valve spool and a spring engageable with one end of the valve spool for moving the same in one direction to block the flow of fluid under pressure therethrough and to connect the end of the shuttle valve to which the flow control is connected to the atmosphere, and the flow control valve being movable in the other direction by means of control fluid under pressure; and, a pilot valve interconnected between each of said flow control valves and said source of fluid under pressure for conducting control fluid under pressure to the flow control valve spool of the flow control valve to which the pilot valve is connected for moving the last named valve spool in the other direction.

4. An air valve as defined in claim 3, wherein: each of said pilot valves includes a valve spool movable in one direction by a solenoid whereby the pilot valve will conduct control fluid under pressure to its respective flow control valve spool and wherein the pilot valve spool is movable in the other direction by a spring whereby the pilot valve spool will block the flow of control fluid under pressure to its respective flow control valve and will exhaust the same to the atmosphere.

5. An air valve as defined in claim 4, wherein: said valve includes electric circuit means connected to the solenoids of the pilot valves and operable to de-energize said solenoids when the shuttle valve is unbalanced due to a failure in the air valve.

References Cited in the file of this patent

UNITED STATES PATENTS

| | | |
|---|---|---|
| 2,013,102 | Ledbetter | Sept. 3, 1935 |
| 2,636,581 | Bitler | Apr. 28, 1953 |
| 2,774,369 | Di Tirro | Dec. 18, 1956 |